United States Patent [19]
Okayama et al.

[11] Patent Number: 5,504,621
[45] Date of Patent: Apr. 2, 1996

[54] TWO-DIMENSIONAL OPTICAL LOW-PASS FILTER

[75] Inventors: Hiroaki Okayama, Hirakata; Shusuke Ono, Takatsuki, both of Japan

[73] Assignee: Matsushita Electric Industrial Co., Ltd., Osaka, Japan

[21] Appl. No.: 112,626

[22] Filed: Aug. 27, 1993

[30] Foreign Application Priority Data

Aug. 28, 1992 [JP] Japan .................................. 4-229853

[51] Int. Cl.⁶ .................................. G02B 5/18
[52] U.S. Cl. ............................... 359/569; 359/574
[58] Field of Search .................... 359/566, 569, 359/574, 575; 348/342

[56] References Cited

U.S. PATENT DOCUMENTS

| 4,083,627 | 4/1978 | Okano | 359/374 |
| 4,093,346 | 6/1978 | Nishino et al. | |
| 5,166,826 | 11/1992 | Ruprecht | 359/569 |

FOREIGN PATENT DOCUMENTS

| 58-13891 | 3/1983 | Japan . |
| 63-25621 | 2/1988 | Japan . |
| 1-252902 | 10/1989 | Japan . |
| 4-31819 | 2/1992 | Japan . |
| 4-349422 | 12/1992 | Japan . |

OTHER PUBLICATIONS

Xuenong Lu, Ying Wang, Minxian Wu and Guofan Jin, "The Fabrication of a 25×25 Multiple Beam Splitter", *Optics Communications*, vol. 72, No. 3/4, Jul. 15, 1989.

U. Krackhardt and N. Streibl, "Design of Dammann–Gratings for Array Generation", *Optics Communications*, vol. 74, No 1/2 Dec. 1, 1989.

Primary Examiner—Vincent P. McGraw
Assistant Examiner—K. P. Hantis
Attorney, Agent, or Firm—Wenderoth, Lind & Ponack

[57] ABSTRACT

A two-dimensional optical low-pass filter includes an optical phase grating having a plurality of unitary grating periods on only one side of a grating plane. Each of the unitary grating periods includes at least two phase retardation structures spaced from each other, thereby providing phase retardation across the grating plane. The two phase retardation structures invariably have at least one non-continuous phase retardation configuration substantially in all directions on the grating plane.

7 Claims, 6 Drawing Sheets

TWO-DIMENSIONAL OPTICAL LOW-PASS FILTER

BACKGROUND OF THE INVENTION

The present invention relates generally to an optical low-pass filter suited for use in an optical system, for example a video camera, employing an image pickup element such as, for example, an image pickup tube or a solid state image pickup element for performing a spatially discrete sampling and, more particularly, to a two-dimensional optical low-pass filter which can be incorporated in an image pickup element and is effective substantially in all directions on a two-dimensional image plane.

DESCRIPTION OF THE PRIOR ART

Conventionally, an image pickup system such as, for example, a video camera system generally employs an image pickup tube or a solid state image pickup element as an image pickup element for taking images therein. Such an image pickup element performs sampling by photoelectrically converting intensity information of light, inputted into an image plane, into electric signals. Because the sampling interval is limited, the sampling is performed spatially discretely. In applications where an image inputted into the image pickup element contains spatial frequency components having a frequency greater than the Nyquist frequency of the image pickup element, an output signal from the image pickup element is indicative of, under the influence of areasing, a spurious pattern or structure such as, for example, a Moiré fringe, or incorrect colors which the input image does not originally have. Because of this, an image signal is generally introduced, prior to the input thereof into the image plane, into an optical low-pass filter which is placed in a portion of the image pickup system to cut off the spatial frequency components of a frequency, greater than the Nyquist frequency or to attenuate them to the extent of being negligible.

Conventional optical low-pass filters generally utilize the birefringence of crystal to obtain a low-pass effect, whereby when a light ray passes through a crystal placed in an optical system, separation thereof into an ordinary ray and an extraordinary ray causes blurring. In the optical low-pass filter employing the crystal, the spatial frequency to be cut off is set depending upon the thickness of the crystal. Because of this, this kind of optical system has the disadvantage of requiring space enough to accommodate the filter therein in order to obtain a desired low-pass filtering characteristic. This optical system is also at a disadvantage in that the raw material of the crystal itself is costly.

To solve these problems, another optical low-pass filter having a phase grating has been proposed and comes in to practice. The reason for this is that the phase grating is relatively inexpensive and does not require a large space for placement thereof.

In applications where the phase grating filter is employed as an optical low-pass filter, it is relatively easy to obtain a two-dimensional low-pass filtering characteristic by rendering a filter substrate to have phase retardation structures on respective sides thereof for providing phase retardation across a filter plane. Because of this, various such phase retardation structures have hitherto been proposed.

However, when the phase grating filter has phase retardation structures only on one side of the filter substrate, it is difficult to obtain an effective low-pass filtering characteristic on the entire image plane, i.e., substantially in all directions on the two-dimensional image plane merely by providing a single phase retardation structure in each of a plurality of unitary or elementary grating periods.

FIG. 1 depicts a conventional optical phase grating filter having a single phase retardation portion in each unitary grating period. FIGS. 2, 3, and 4 depict cross-sectional configurations taken along lines II—II, III—III, and IV—IV in FIG. 1, respectively. FIG. 5 is a graph indicating MTF characteristics obtained by the phase retardation portions having respective cross-sectional configurations shown in FIGS. 2, 3, and 4.

The phase retardation portions shown in FIG. 2 provide a sufficient phase retardation as shown by II in FIG. 5 and, therefore, exhibit a sufficient low-pass filtering characteristic. However, as the phase retardation becomes small as shown in FIG. 3, the filtering characteristic exhibits an insufficient low-pass characteristic. In the event that the phase retardation becomes zero as shown in FIG. 4, the filter allows all of the spatial frequency components to pass therethrough.

Although the phase grating filter can be so configured as to have the same cross-sectional configuration as that shown in Fig. 2 only in limited directions, an effective phase grating filter which has phase retardation structures only on one surface of the substrate and provides a sufficient phase retardation substantially in all directions on the two-dimensional image plane has not hitherto been proposed.

In view of handling and mass production, it is preferred for the phase grating low-pass filter to have phase retardation portions which produce the low-pass effect on only one surface of the substrate. In applications where the low-pass filter is utilized in an image pickup system employing an image pickup element, images having a good quality cannot be obtained unless the low-pass effect is produced substantially in all directions on the two-dimensional image plane.

A phase grating low-pass filter having the phase retardation structures only on one surface of the substrate is particularly useful, because such a filter can be placed in close proximity to the image plane, thereby contributing to reduction of the overall length of the optical image pickup system, i.e., the miniaturization thereof. Because the conventional phase grating filters have difficulties in providing a sufficient two-dimensional performance, the incorporation of both of the phase grating filter and the image plane into the image pickup element was practically impossible.

SUMMARY OF THE INVENTION

The present invention has been developed to overcome the above-described disadvantages.

It is accordingly an object of the present invention to provide an improved two-dimensional optical low-pass filter having a superior low-pass characteristic and capable of cutting off spatial frequency components of a frequency, greater than one half the sampling frequency which components occasionally cause spurious signals, or attenuating them to the extent of being negligible.

Another object of the present invention is to provide a two-dimensional optical low-pass filter of the above-described type which has a simple structure and can be readily manufactured at a low cost.

In accomplishing the above and other objects, a two-dimensional optical low-pass filter according to the present invention comprises an optical phase grating having a plurality of unitary grating periods on only one side of a grating plane. Each of the unitary grating periods includes at least two phase retardation structures spaced from each other, thereby providing phase retardation across the grating plane.

Preferably, the at least two phase retardation structures invariably have at least one non-continuous phase retardation configuration substantially in all directions on the grating plane.

In another aspect of the present invention, a two-dimensional optical low-pass filter comprises an optical phase grating having a plurality of rectangular unitary grating periods on only one side of a grating plane, a plurality of first phase retardation elements formed in a two-dimensional matrix on the one side of the grating plane, and a plurality of second phase retardation elements regularly spaced from the first phase retardation elements, with each of the first phase retardation elements surrounded by four second phase retardation elements. Each of the unitary grating periods includes one first phase retardation element at a center thereof and a quarter of each of four surrounding second phase retardation elements at each corner thereof, thereby providing phase retardation across the grating plane. Each of the second phase retardation elements extends over a plurality of, for example four, adjoining unitary grating periods. Because of this, there invariably exists a region or regions having at least one phase retardation portion on a border between two adjoining unitary grating periods.

Although the optical low-pass filter of the above-described construction has phase retardation configurations on only one side of a substrate, i.e., the grating plane, it exhibits a sufficient low-pass effect substantially in all directions on the two-dimensional plane. The optical low-pass filter according to the present invention contributes to realization of a compact optical system because it does not require a space which has hitherto been required in the conventional low-pass filters employing a crystal.

Furthermore, the optical low-pass filter according to the present invention can be incorporated into an image pickup element, thereby enhancing the added value of the image pickup element itself. Also, because the space for holding the crystal is not required in an optical barrel, not only can the optical barrel be made compact, but adjustments thereof can also be facilitated.

In order to obtain a desired low-pass characteristic, it is preferred that each of the first phase retardation elements has a generally cross-shaped base, whereas each of the second phase retardation has a generally rectangular base.

Alternatively, each of the first phase retardation elements may have a recess defined therein. The provision of such first phase retardation elements can change the filtering characteristic. Accordingly, the configuration of the first phase retardation elements can be so chosen as to meet the particular requirements.

As described hereinabove, because the optical low-pass filter according to the present invention has the spaced first and second phase retardation elements both of which differ in configuration and are disposed in a specific relationship on only one side of the substrate, it provides a transfer characteristic of a desired spatial frequency substantially in all directions on the image plane and exhibits substantially the same characteristic with respect to different wavelengths.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
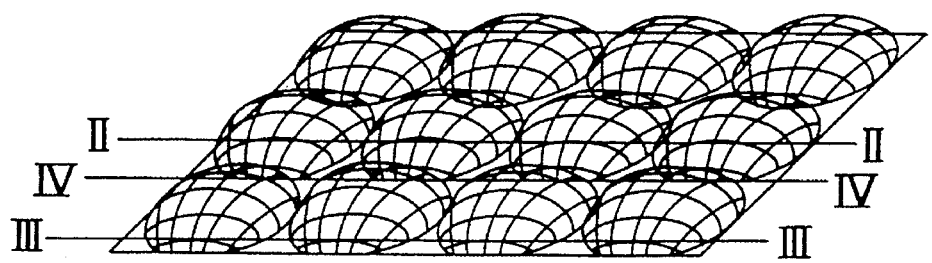
FIG. 1 is a schematic perspective view of a conventional phase grating having a single phase retardation portion in each unitary grating period.
Figure 2:
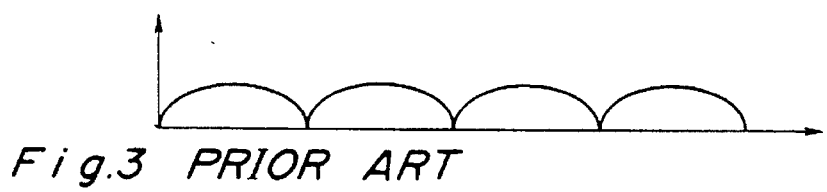
FIG. 2 is a cross-sectional view taken along line II—II in FIG. 1.
Figure 3:
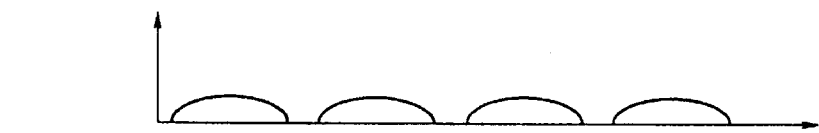
FIG. 3 is a cross-sectional view taken along line III—III in FIG. 1.
Figure 4:
FIG. 4 is a cross-sectional view taken along line IV—IV in FIG. 1.
Figure 5:
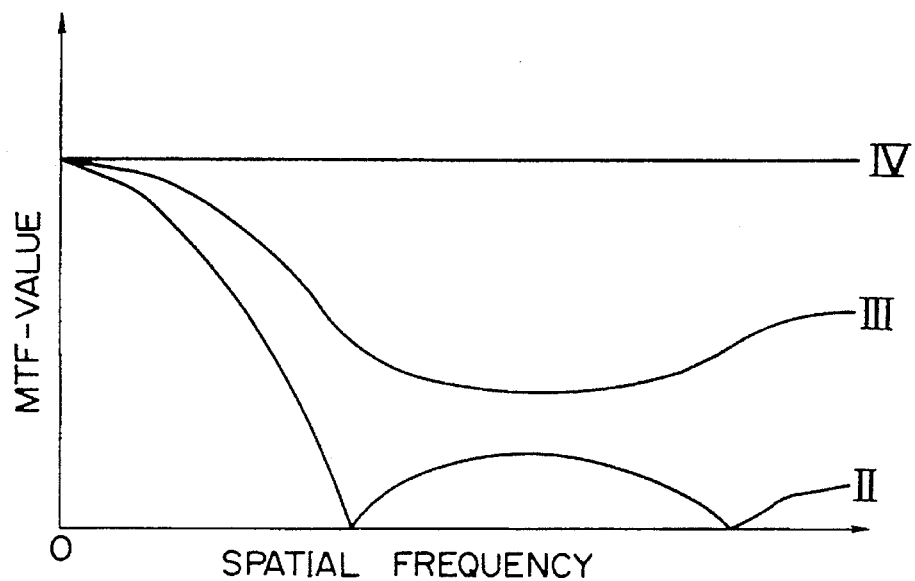
FIG. 5 is a graph indicating MTF characteristics obtained by the phase retardation portions having respective cross-sectional configurations shown in FIGS. 2, 3, and 4.
Figure 6:
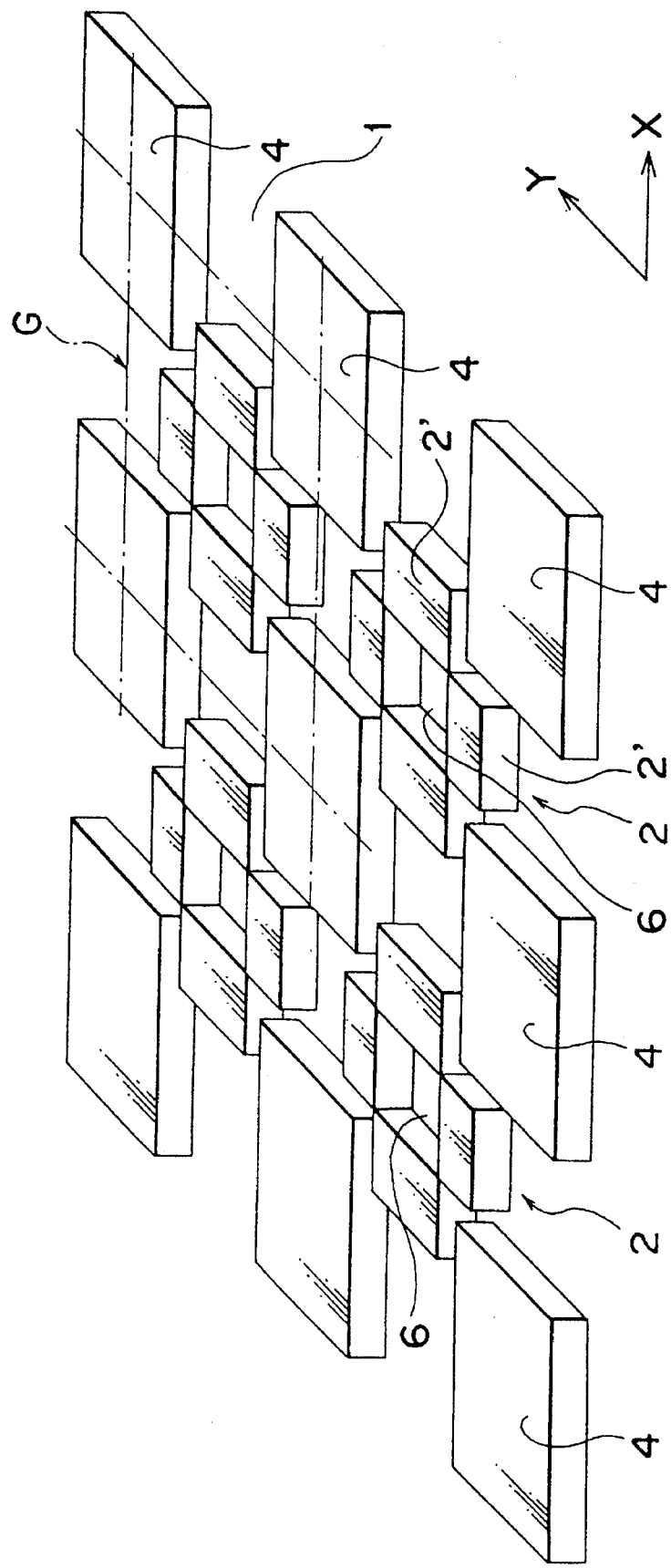
FIG. 6 is a perspective view of an optical low-pass filter according to a first embodiment of the present invention.
Figure 7:
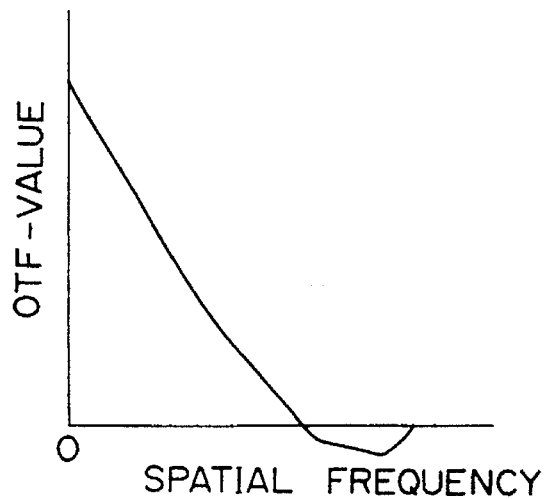
FIG. 7 is a graph indicating an OTF (optical transfer function) characteristic of the filter of FIG. 6 in a direction parallel to the axis of abscissa.
Figure 8:
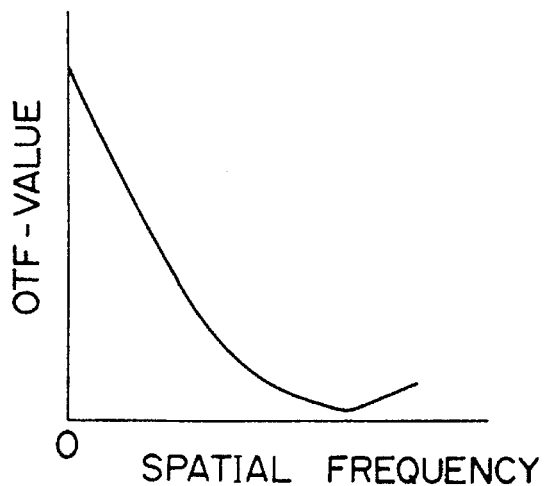
FIG. 8 is a graph similar to FIG. 7, but indicating another OTF characteristic in a direction inclined 30° from the axis of abscissa.
Figure 9:
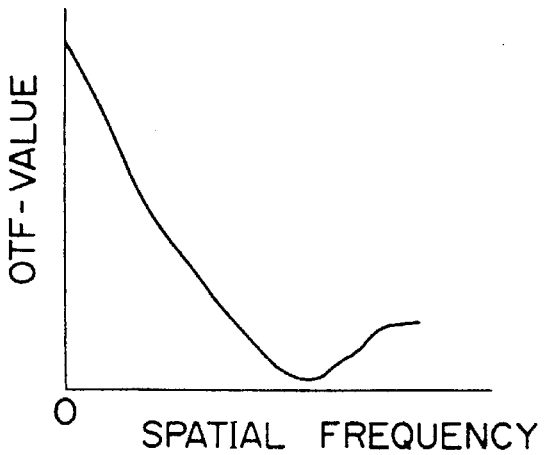
FIG. 9 is a graph similar to FIG. 7, but indicating a further OTF characteristic in a direction inclined 45° from the axis of abscissa.
Figure 10:
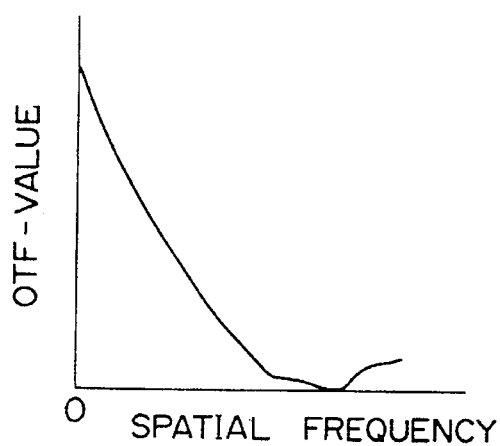
FIG. 10 is a graph similar to FIG. 7, but indicating a still further OTF characteristic in a direction inclined 60° from the axis of abscissa.
Figure 11:
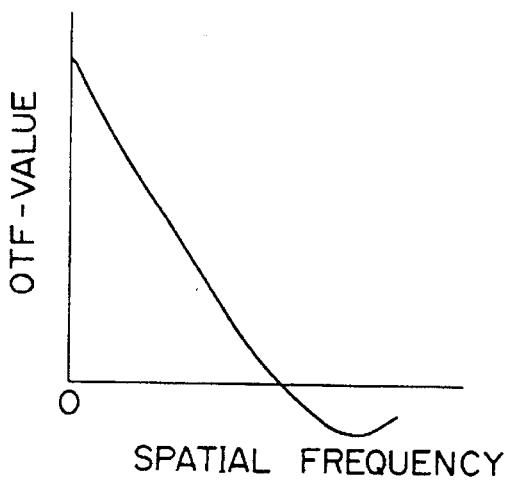
FIG. 11 is a graph similar to FIG. 7, but indicating another OTF characteristic in a direction inclined 90° from the axis of abscissa.

Referring now to the drawings, there is shown in FIG. 6 a two-dimensional optical low-pass filter according to a first embodiment of the present invention. The optical low-pass filter shown in FIG. 6 comprises a plurality of generally cross-shaped first phase retardation elements 2 laid in a matrix and a plurality of second phase retardation elements 4 each of which is positioned in a space delimited by four surrounding first phase retardation elements 2 and regularly spaced therefrom. All of the first and second phase retardation elements 2 and 4 are formed on only one side of a substrate 1. Each of the first phase retardation elements 2 is made up of four phase retardation portions 2' each in the form of a generally cubic body. Each of the four phase retardation portions 2' is in abutment with two adjoining phase retardation portions 2' so that a square center space 6 may be delimited by the four phase retardation portions 2'. Each of the second phase retardation elements 4 is also in the form of a cubic body or a rectangular parallelepiped. The first and second phase retardation elements 2 and 4 are made of a resinous material having a refractive index (nd) of 1.5597 and an Abbe number (vd) of 44.

This optical low-pass filter has a plurality of rectangular unitary gratings, encircled by single dotted lines and generally identified by G, formed in a two-dimensional matrix. Each of the unitary gratings G includes one first phase retardation element 2 positioned at the center thereof and a quarter of each of the four second phase retardation elements 4.

The optical low-pass filter of FIG. 6 provides a sufficient transfer characteristic because there does not exist any region having a continuous phase retardation configuration or that having no phase retardation configuration substantially in all directions on a two-dimensional plane.

Although the optical low-pass filter has periodically arranged phase retardation elements, it may have, within a specific range exerting no influence upon the performance thereof, non-periodic regions wherein regions having no phase retardation configurations or those having phase retardation configurations that are continued to each other. More specifically, it is sufficient if periodicity is established as a whole, and slight non-continuous changes in the phase retardation configuration do not affect the performance of the optical low-pass filter.

FIGS. 7 through 11 are graphs each indicating the spatial frequency characteristic (OTF characteristic) of the optical low-pass filter of FIG. 6 in several directions on the two-dimensional plane, when a wavelength of 587 nm is employed. As can be seen from these graphs, the optical low-pass filter of FIG. 6 exhibits a desired superior low-pass characteristic.

Figure 12:
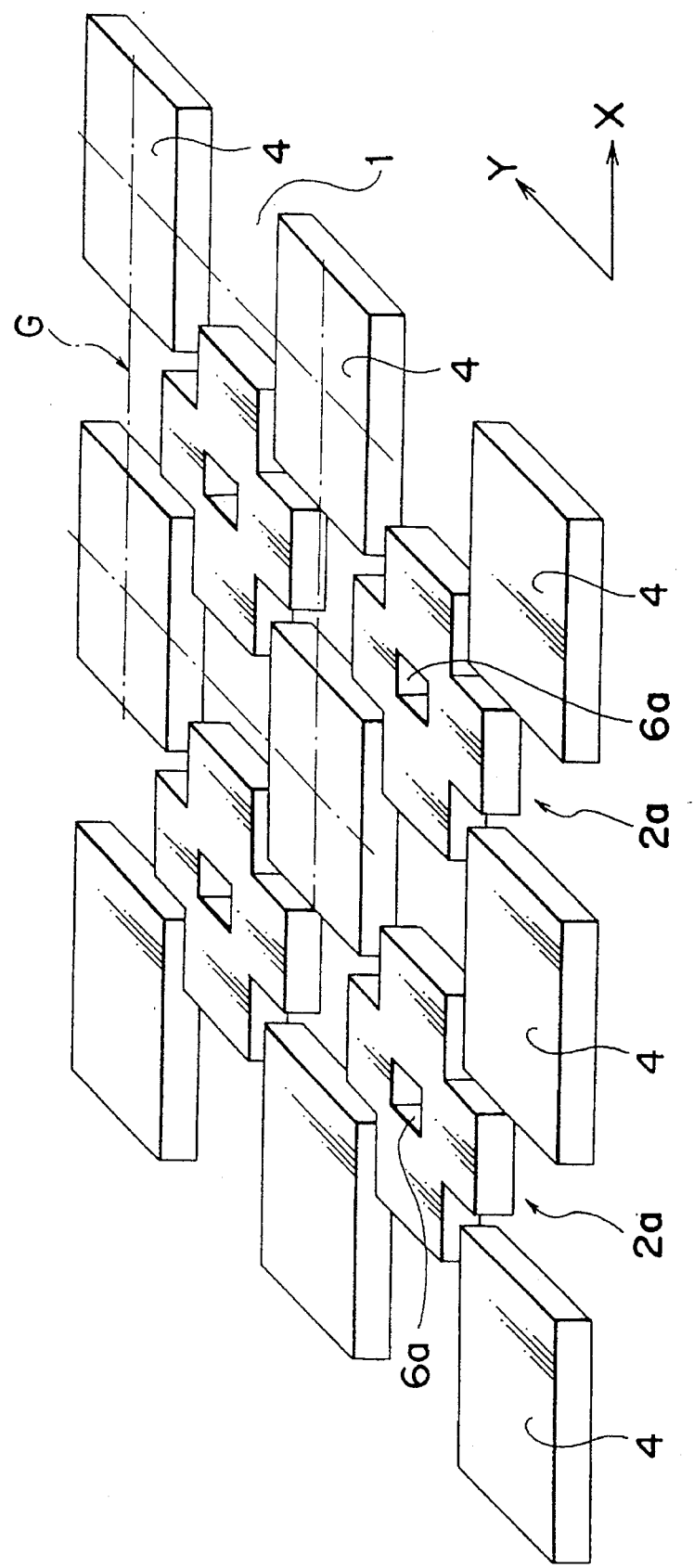
FIG. 12 is a view similar to FIG. 6, but according to a second embodiment of the present invention.

FIG. 12 depicts a two-dimensional optical low-pass filter according to a second embodiment of the present invention. The optical low-pass filter of FIG. 12 has, in each unitary grating period, a generally cross-shaped first phase retardation element 2a having a square recess 6a defined therein at the center thereof.

Figure 13:
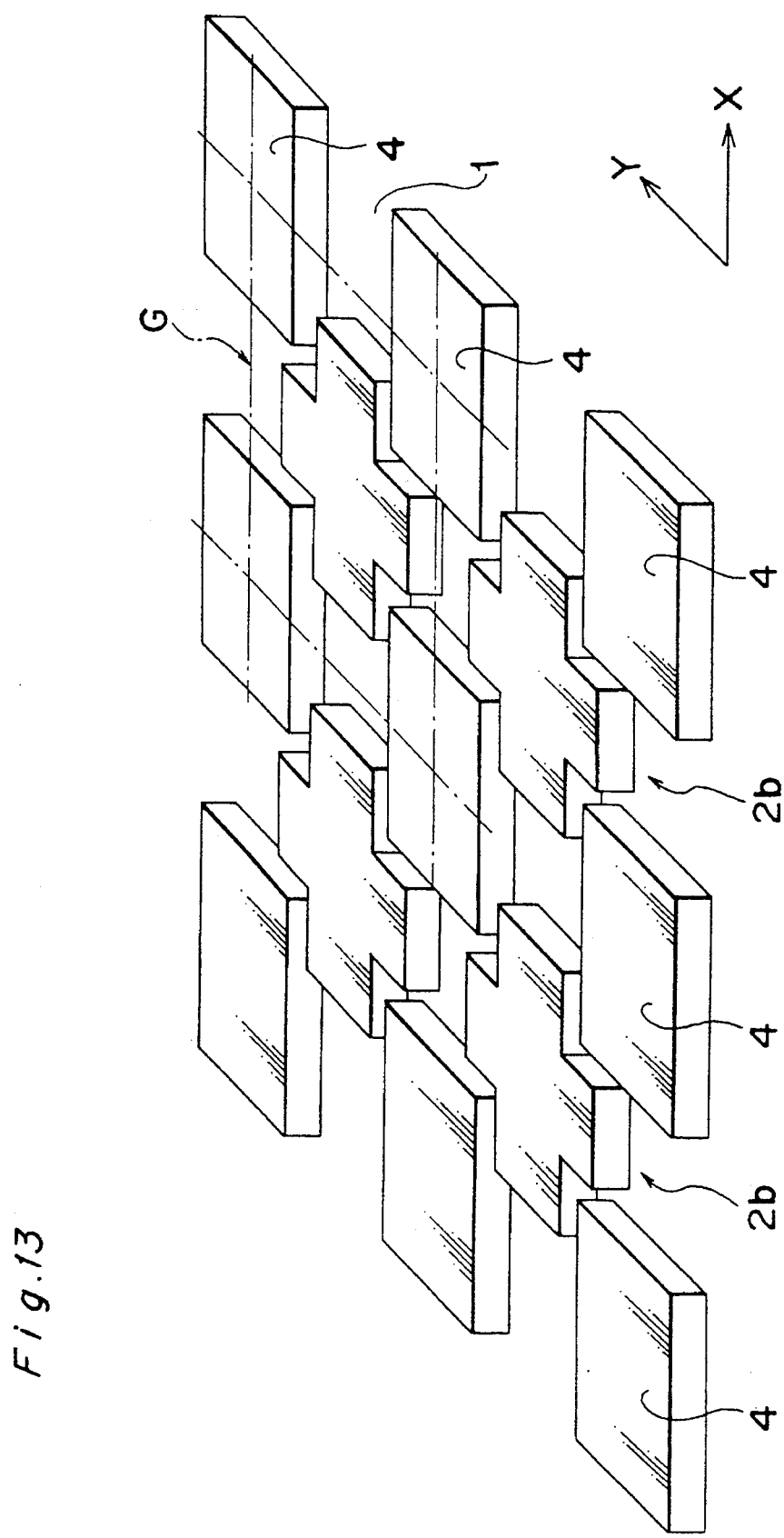
FIG. 13 is view similar to FIG. 6, but according to a third embodiment of the present invention.

FIG. 13 depicts a two-dimensional optical low-pass filter according to a third embodiment of the present invention. The optical low-pass filter of FIG. 13 is somewhat similar to that of FIG. 12, but differs from the latter in that a generally cross-shaped first phase retardation element 2b of the former has no central recess.

Figure 14:
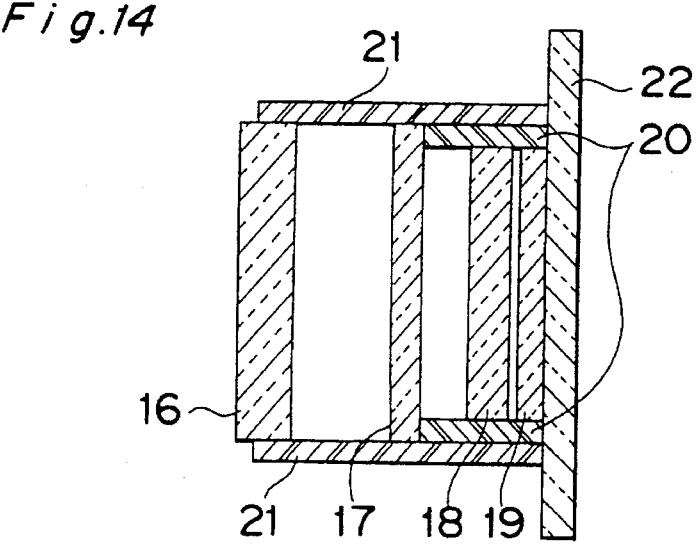
FIG. 14 is a schematic cross-sectional view of an image pickup element incorporating the filter of the present invention therein.

FIG. 14 schematically depicts an image pickup element incorporating the phase grating filter according to the present invention. As shown in FIG. 14, the image pickup element comprises a base plate 22, a glass cover 16 for protecting the inside of the image pickup element, a phase grating filter 17 of the present invention, a color separation filter 18, and an image plane element 19. The glass cover 16 is supported by a frame 21 for hermetically sealing the inside of the image pickup element, whereas the phase grating filter 17, the color separation filter 18, and the image plane element 19 are supported by, for example, a plurality of spacers 20 so as to extend parallel to one another in a spaced relationship. Both of the frame 21 and the spacers 20 are rigidly secured to the base plate 22. It is particularly important to space the phase grating filter 17 a certain distance away from the image plane 19. The image pickup element shown in FIG. 14 has a high-performance by incorporating the phase grating filter 17 therein.

It is, however, to be noted that the construction shown in FIG. 14 is a basic one, and the performance of the image pickup element is not changed, for example, by inserting an additional functional element such as an on-chip lens between the color separation filter 18 and the image plane element 19 if a reduced optical distance is maintained.

The optical low-pass filters as shown in FIGS. 6, 12, and 13 have substantially the same fundamental characteristic. However, when the characteristic is required to be guaranteed, particularly in horizontal and vertical directions, the characteristic of the three optical low-pass filters differ in other directions. Accordingly, an appropriate one should be selected from among these three types of filters so as to meet the system requirements.

It is to be noted here that in the optical low-pass filter of FIG. 6, although the four phase retardation portions 2' of the first phase retardation element 2 are in abutment with one another at respective vertical inner edges, they may also be spaced a certain distance away from one another.

It is further to be noted that although the first phase retardation element 2, 2a, or 2b and the second phase retardation element 6 are indicated as having a generally cross-shaped base and a generally rectangular base, respectively, the vertical cross-sectional configuration thereof is not always required to be rectangular.

It is also to be noted that the second phase retardation element 4 may have a recess defined therein for the purpose of changing the filtering characteristic.

It is also to be noted that the configuration of each phase retardation element is not limited to that mentioned in the above embodiments, and substantially the same characteristic can be obtained by any other suitable configuration similar thereto. For example, vertical edges of each phase retardation element may be either sharp or round.

The phase grating filter according to the present invention provides a desired low-pass characteristic substantially in all directions on the two-dimensional image plane and can be readily manufactured at a low cost without requiring a relatively large place for placement thereof inside the image pickup element.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A two-dimensional optical low-pass filter, comprising:

a substrate having two sides; and an optical phase grating comprising a plurality of unitary grating periods on only one side of said substrate, each one of said plurality of unitary grating periods comprising at least two phase retardation structures spaced from each other on said substrate so as to provide phase retardation across said grating substrate;

wherein said at least two phase retardation structures in each one of said plurality of unitary grating periods form a non-continuous phase retardation configuration and a non-continuous space therebetween in all directions in a plane on said one side of said substrate.

2. A two-dimensional optical low-pass filter, comprising:

a substrate having two sides;

an optical phase grating comprising a plurality of rectangular unitary grating periods on only one side of said substrate, each of said rectangular unitary grating periods having a center and four corners;

a plurality of first phase retardation elements formed in a two-dimensional matrix on said one side of said substrate; and a plurality of second phase retardation elements regularly spaced from said first phase retardation elements on said one side of said substrate, each of said first phase retardation elements being surrounded by four of said second phase retardation elements;

wherein each one of said plurality of rectangular unitary grating periods comprises one of said first phase retardation elements at said center thereof and a quarter of each of the respective said four of said second phase retardation elements surrounding the one of said first phase retardation elements, each said quarter being located at a respective one of said four corners of said rectangular unitary grating period; and wherein said first and second phase retardation structures in each one of said plurality of rectangular unitary grating periods form a non-continuous phase retardation configuration and a non-continuous space therebetween in all directions in a plane on said one side of said substrate.

3. The optical low-pass filter of claim 2 wherein each of said first phase retardation elements has a substantially cross-shaped base and each of said second phase retardation elements has a substantially rectangular base.

4. The optical low-pass filter of claim 3, wherein each of said first phase retardation elements has a recess in the center of said substantially cross-shaped base.

5. An image pickup element, comprising:

an image plane element; and a two-dimensional optical low-pass filter spaced from said image plane element, said optical low-pass filter comprising:

a substrate having two sides, an optical phase grating comprising a plurality of rectangular unitary grating periods on only one side of said substrate, each of said rectangular unitary grating periods having a center and four corners, a plurality of first phase retardation elements formed in a two-dimensional matrix on said one side of said substrate, and a plurality of second phase retardation elements regularly spaced from said first phase retardation elements on said one side of said substrate, each of said first phase retardation elements being surrounded by four of said second phase retardation elements, wherein each one of said plurality of rectangular unitary grating periods comprises one of said first phase retardation elements at said center thereof and a quarter of each of the respective said four of said second phase retardation elements surrounding the one of said first phase retardation elements, each said quarter being located at a respective one of said four corners of said rectangular unitary grating period; and wherein said first and second phase retardation structures in each one of said plurality of rectangular unitary grating periods form a non-continuous phase retardation configuration and a non-continuous space therebetween in all directions in a plane on said one side of said substrate.

6. The image pickup element of claim 5, wherein each of said first phase retardation elements has a substantially cross-shaped base and each of said second phase retardation elements has a substantially rectangular base.

7. The optical low-pass filter of claim 6, wherein each of said first phase retardation elements has a recess in the center of said substantially cross-shaped base.

* * * * *